(12) United States Patent
Flaherty

(10) Patent No.: US 11,389,731 B2
(45) Date of Patent: *Jul. 19, 2022

(54) USER REGISTRATION

(71) Applicant: CFPH, LLC, New York, NY (US)

(72) Inventor: Phillip L. Flaherty, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,137

(22) Filed: Jun. 22, 2020

(65) Prior Publication Data

US 2020/0316478 A1 Oct. 8, 2020

Related U.S. Application Data

(60) Continuation of application No. 15/664,570, filed on Jul. 31, 2017, now Pat. No. 10,688,398, which is a division of application No. 14/204,463, filed on Mar. 11, 2014, now Pat. No. 9,744,444.

(60) Provisional application No. 61/776,748, filed on Mar. 11, 2013.

(51) Int. Cl.
*A63F 13/792* (2014.01)
*A63F 13/77* (2014.01)
*G07F 17/32* (2006.01)
*A63F 13/70* (2014.01)

(52) U.S. Cl.
CPC ............ *A63F 13/792* (2014.09); *A63F 13/70* (2014.09); *A63F 13/77* (2014.09); *G07F 17/3232* (2013.01); *G07F 17/3244* (2013.01)

(58) Field of Classification Search
CPC .. G07F 17/3244; G07F 17/3232; A63F 13/77; A63F 13/792; A63F 13/70
See application file for complete search history.

(56) References Cited

U.S. PATENT DOCUMENTS

| | | | |
|---|---|---|---|
| 6,076,731 A | 6/2000 | Terrell | |
| 6,612,928 B1 | 9/2003 | Bradford | |
| 6,709,333 B1 | 3/2004 | Bradford et al. | |
| 7,980,948 B2 | 7/2011 | Rowe et al. | |

(Continued)

FOREIGN PATENT DOCUMENTS

| | | |
|---|---|---|
| AU | 2014249291 | 10/2015 |
| CA | 2905733 | 10/2014 |

(Continued)

OTHER PUBLICATIONS

Notification of the International Search Report and Written Opinion for App. No. PCT/US2014/022632; dated Jul. 1, 2014; 18 pages.

(Continued)

*Primary Examiner* — Steve Rowland

(57) ABSTRACT

An agent that may assist a service provider of gaming services with registering/signing up users, with accepting funds/money from a user and depositing these funds in a gaming account of the user for the user to play games with, and/or with receiving requests from a user to withdrawal funds from the user's account and paying the user the withdrawn funds. The agent may also assist a user in obtaining a report of an account of the user, the account being associated with a service provider that provides gaming services.

20 Claims, 1 Drawing Sheet

(56) References Cited

U.S. PATENT DOCUMENTS

| | | | |
|---|---|---|---|
| 8,210,931 B2 | 7/2012 | Alderucci et al. | |
| 9,240,098 B2 | 1/2016 | Williams et al. | |
| 9,269,224 B2 | 2/2016 | Williams et al. | |
| 9,744,444 B2 | 8/2017 | Flaherty | |
| 10,096,207 B2 | 10/2018 | Williams et al. | |
| 2002/0091646 A1* | 7/2002 | Lake | G06Q 20/342 705/67 |
| 2003/0069071 A1 | 4/2003 | Britt | |
| 2003/0092489 A1 | 5/2003 | Veradej | |
| 2003/0128866 A1 | 7/2003 | McNeal | |
| 2003/0142855 A1 | 7/2003 | Kuo | |
| 2003/0171145 A1 | 9/2003 | Rowe | |
| 2003/0228898 A1 | 12/2003 | Rowe | |
| 2004/0038733 A1 | 2/2004 | Walker et al. | |
| 2004/0039655 A1* | 2/2004 | Chau | G06Q 20/04 705/26.1 |
| 2004/0147309 A1 | 7/2004 | Chamberlain et al. | |
| 2004/0214643 A1 | 10/2004 | Parrott | |
| 2005/0026670 A1 | 2/2005 | Lardie | |
| 2005/0054417 A1 | 3/2005 | Parrott et al. | |
| 2005/0086168 A1* | 4/2005 | Alvarez | G06Q 20/10 705/41 |
| 2005/0239543 A1 | 10/2005 | Enzminger | |
| 2006/0040726 A1 | 2/2006 | Szrek | |
| 2006/0068917 A1 | 3/2006 | Snoddy et al. | |
| 2006/0205494 A1 | 9/2006 | Fujimoto | |
| 2006/0281543 A1 | 12/2006 | Sutton et al. | |
| 2007/0027819 A1 | 2/2007 | Cowburn | |
| 2008/0008363 A1 | 1/2008 | Bonalle | |
| 2008/0058105 A1 | 3/2008 | Combs | |
| 2008/0071674 A1* | 3/2008 | Thackston | G06Q 40/025 705/38 |
| 2008/0113776 A1 | 5/2008 | Sommer | |
| 2008/0188308 A1 | 8/2008 | Shepherd et al. | |
| 2008/0214261 A1 | 9/2008 | Alderucci | |
| 2008/0268934 A1 | 10/2008 | Mattice et al. | |
| 2009/0048026 A1 | 2/2009 | French | |
| 2009/0124376 A1 | 5/2009 | Kelly et al. | |
| 2009/0176565 A1 | 7/2009 | Kelly | |
| 2009/0276341 A1 | 11/2009 | McMahan et al. | |
| 2010/0124990 A1 | 5/2010 | Crowder | |
| 2010/0275267 A1 | 10/2010 | Walker et al. | |
| 2011/0014975 A1 | 1/2011 | Grabiec et al. | |
| 2011/0245943 A1 | 10/2011 | Agarwal | |
| 2011/0251906 A1 | 10/2011 | Loevenguth | |
| 2012/0021832 A1 | 1/2012 | Lyons | |
| 2013/0218769 A1 | 8/2013 | Pourfallah | |
| 2014/0108249 A1 | 4/2014 | Kulpati | |
| 2014/0256423 A1 | 9/2014 | Williams et al. | |
| 2014/0256425 A1 | 9/2014 | Flaherty | |
| 2014/0274361 A1 | 9/2014 | Williams et al. | |
| 2014/0370959 A1* | 12/2014 | Yacenda | G07F 17/3241 463/18 |
| 2016/0133092 A1 | 5/2016 | Williams et al. | |
| 2016/0351010 A1 | 12/2016 | Williams et al. | |
| 2017/0326455 A1 | 11/2017 | Flaherty | |
| 2017/0340973 A1 | 11/2017 | Flaherty | |
| 2019/0035217 A1 | 1/2019 | Williams et al. | |
| 2020/0152004 A1 | 5/2020 | Williams et al. | |

FOREIGN PATENT DOCUMENTS

| | | |
|---|---|---|
| CN | 102596339 | 7/2012 |
| JP | 2000342857 | 12/2000 |
| JP | 2007-75348 | 3/2007 |
| JP | 2007075348 | 3/2007 |
| JP | 2008-253743 | 2/2008 |
| JP | 2008-546443 | 12/2008 |
| JP | 2010-509031 | 3/2010 |
| MO | I/001265 | 3/2014 |
| TW | 200945232 | 11/2009 |
| TW | 201113743 | 4/2011 |
| TW | 201508662 | 3/2015 |
| WO | 03058878 | 7/2003 |
| WO | WO 2004/095384 | 11/2004 |
| WO | WO 2006/138064 | 12/2006 |
| WO | WO 2008/061138 | 5/2008 |
| WO | WO 2014/164504 | 10/2014 |

OTHER PUBLICATIONS

Extended EP Search Report for EP Application No. 14779876.3 dated Oct. 14, 2016; 8 pages.

AU First Examination Report for Application No. 2014249291 dated May 16, 2017; 3 pages.

CN Office Action for Application No. 201480026794.7 dated May 25, 2017; 18 pages (w/ English Translations).

Communication Pursuant to Article 94(3) EPC for EP Application No. 14779876.3 dated Dec. 6, 2017; 9 pages.

JP Office Action for Application No. 2016-501021; dated Feb. 13, 2018; (7 pages w/English Translations).

CN Office Action for Application No. 201480026794.7 dated Feb. 5, 2018; 18 pages (w/English Translations).

AU Notice of Acceptance for Application No. 201424929; dated Mar. 29, 2018; 3 pages.

JP Office Action for Application No. 2016-501021; dated Oct. 2, 2018; (4 pages w/English Translations).

TW Office Action for Application No. 103108589; dated Dec. 20, 2017; (7 pages in CN Characters and English Translations).

* cited by examiner

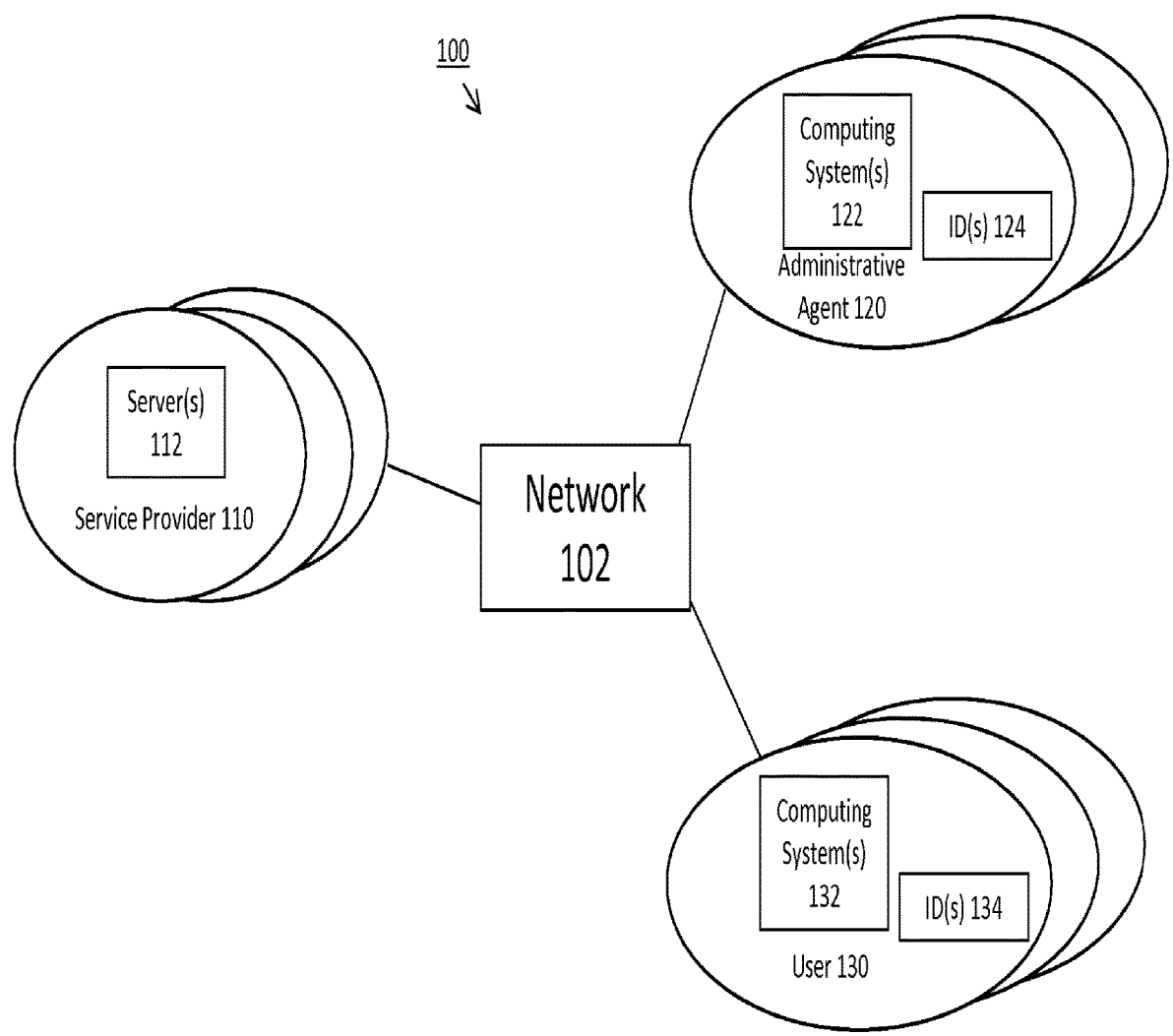

USER REGISTRATION

CROSS REFERENCE TO RELATED APPLICATION

This application is a continuation of U.S. patent application Ser. No. 15/664,570 filed on Jul. 31, 2017 which is a divisional of U.S. patent application Ser. No. 14/204,463 filed on Mar. 11, 2014 (now U.S. Pat. No. 9,744,444 issued on Aug. 29, 2017) which claims the benefit of U.S. provisional application No. 61/776,748 filed Mar. 11, 2013, which are hereby incorporated by reference herein in their entireties.

FIELD

Some embodiments relate to gaming.

BACKGROUND

Systems may be used for the gaming over a network.

BRIEF DESCRIPTION OF THE FIGURES

FIG. 1 shows an example system according to some embodiments.

DETAILED DESCRIPTION

Referring to FIG. 1, there is shown an example system 100 according to an example embodiment. In general, system 100 may be a gaming based system, although system 100 may apply to other types of applications. System 100 may include one or more first entities 110, one or more second entities 120, and a plurality of users 130.

A first entity 110 may be a service provider that provides gaming services to users 130, or in other words, provides one or more types of games that users 130 may play. Such games may include, for example, any one or more of:

- Games where a user may bet/wager against a house type entity (e.g. entity 110). Such games may include, e.g., casino type games such as card games (e.g., black jack, baccarat), dice games (e.g., craps), roulette, slots, etc. These games may be virtual games (e.g., use computer generated cards, dice, roulette wheel spins, slot machine reel spins) in which game outcomes/game results are based on/determined from random number generator(s), for example. As another example, these games may be non-virtual games in which game outcomes/game results are based on actual cards, dice, roulette wheel spins, slot machine reel spins, etc. As another example, these games may be a combination of both. Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.
- Games where a user may bet/wager on sporting events, including, for example, football, soccer, basketball, baseball, hockey, horses, dogs, cars, etc. Such games may be played/wagered against a house type entity/book maker (e.g. entity 110) and/or may be pari-mutuel. Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.
- Games where a user may place bets/wagers on fantasy sporting events, including, for example, football, soccer, basketball, baseball, hockey, horses, dogs, cars, etc. Such games may be played/wagered against a house type entity/book maker (e.g. entity 110) and/or be played against other users. Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.
- Interactive games where a user plays against one or more other users, for example. Such games may include casino type games such as card games (e.g., poker). These games may be virtual games (e.g., use computer generated cards) in which game outcomes/game results are based on/determined from random generator(s), for example. As another example, these games may be non-virtual games in which game outcomes/game results are based on actual cards. As another example, such games may include fantasy sporting events in which users play against one another. As another example, such games may be video games in which users play against users. As another example, such games may include games of chance and semi-chance such as chess, checkers, board games, Scrabble, Risk, etc. Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.
- Lottery/lotto games where a user may choose one or more numbers, for example, keno, bingo, etc. These games may be virtual games in which selected numbers, for example, to determine game outcomes are based on/determined from random generator(s), for example. As another example, these games may be non-virtual games in which selected numbers, for example, to determine game outcomes are based on/determined from actual numbers pulled from hoppers, for example. Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.
- Games where a user wagers on anything, such as weather, movies, games shows, etc. Such games may be played against other users and/or against a house type entity (e.g. entity 110). Such games may be played with real money/currency, may be played with points/tokens/credits/etc. that a user purchases with real money, and/or may be played with points/tokens/credits/etc. that a user is assigned but which the user does not purchase with real money. One skilled in the art will recognize that other types of games are possible.

One skilled in the art will recognize that these games are merely examples and that service provider 110 may offer other types of games.

Service provider 110 may own and/or operate one or more computing systems (e.g. servers) collectively shown as computing system 112 in FIG. 1. Computing system 112 may be referred to herein as a server for purposes of description. However, it should be understood that the use of the term server is non-limiting, and that other types of computing systems may be used. Server 112 may include one or more processors and one or memories and/or be interfaced to one or more external memories, such as one or more databases. Server 112 may include one or more network hardware/software/firmware based interfaces that enable the server to connect to and communicate over network 102. Server 112 may also include one or more software and/or firmware and/or hardware based application(s) that execute on the server. One or more of such applications may be web based applications. As an example, such applications may include actual games offered by service provider 110, and administrative applications such as user account balance management, user registration/signup, etc.

An entity 120 may be an entity that performs tasks or functions on behalf of or for a service provider 110 wherein those tasks or functions are administrative functions related to users of a service provider. As an example, an entity 120 may be an agent of a service provider 110 and in particular, may be an entity that the service provider trusts (i.e., a trusted entity). For description purposes only, an entity 120 will be referred to herein as an administrative agent. As an example, an administrative agent 120 may assist a service provider 110 with registering/signing up new users, with accepting funds/money from a user and depositing these funds in the user's gaming account for the user to bet/wager with, with receiving requests from a user to withdrawal funds from the user's account and paying the user the withdrawn funds, etc. One skilled in the art will recognize that these are merely examples and an administrative agent 120 may perform other and/or additional functions for a service provider 110. One skilled in the art will also recognize that an administrative agent 120 may perform functions for multiple different service providers. As a further example, system 100 may include a plurality of administrative agents. A given administrative agent may be associated with only one service provider and/or may be associated with a plurality of service providers.

An administrative agent 120 may have one or more physical locations that a user can physically visit. Such location(s) may be physically separate from and/or remote from a service provider. Administrative agents may be physically dispersed over a geographic area, such as a town, city, state, etc. As one example, an administrative agent 120 may only perform functions related to user administration/administrative functions (such as user registration, fund deposit, fund withdrawal, etc.) for a service provider(s) 110. As another example, an administrative agent 120 may perform such administrative functions for a service provider(s) 110 but may also perform other functions for a service provider, such as marketing. As another example, an administrative agent 120 may perform administrative functions for a service provider(s) 110 but may also perform other functions completely separate from a service provider 110. For example, an administrative agent 120 may be a bank/bank teller, an owner of a store, a notary, a lawyer, etc. One skilled in the art will recognize that these are merely examples.

According to an example embodiment, in order for an administrative agent 120 to perform functions for a service provider 110, the service provider may issue to the agent a unique ID(s) 124. As described herein, an administrative agent, when performing tasks for a service provider 110, may authenticate itself to the service provider 110 through this ID. For example, an administrative agent may need to physically view a user and a photo ID of that user and verify to the service provider that "John Doe" is in fact "John Doe" (example name). The administrative agent may call the service provider 110 and/or enter into a computer system that in fact the administrative agent has made this visual verification and authenticate this information to the service provider through the use of ID 124. In other words, through the use of the ID, the service provider may trust that service provider is communicating with a trusted agent and therefore trust the information received from the agent. According to another example, two or more service providers may be affiliated (such as through a common owner, through agreement, etc.). Here, an agent may have/use the same ID 124 to perform functions for affiliated service providers.

ID 124 may take various forms. For example, the ID may be a login and/or password. As another example, in addition to or in place of a login/password, the ID may simply be a value an administrative agent knows and provides when necessary; the ID may be encoded on a card (e.g., an RFID card, magnetic strip, bar code, etc) that an agent may swipe through a reader and thereby provide the ID to the service provider; and/or the ID may be encoded on a memory device/memory stick that an administrative agent inserts into a computer thereby providing the ID to the service provider. One skilled in the art will recognize that other variations are possible. As another variation, an administrative agent may need to provide a biometric (e.g., retina scan, fingerprint, etc) in conjunction with providing an ID.

In order for an administrative agent 120 to perform functions for a service provider 110, an administrative agent may also have more computing systems 122 such as a computer, server, laptop, computing pad, smart phone etc. that may intercommunicate with a server 112, for example. Such a computing system 122 may be dedicated to interworking with a service provider(s) 110/server(s) 112 (one computing system 122 may interwork with only one service provider and therefore an agent may need multiple systems), and/or computing system 122 may interwork with many service providers, and/or may be a general purpose device. Such a computing system may include one or more processors and one or memories and/or be interfaced to one or more external memories, such as one or more and/or databases. A computing system 122 may include one or more network hardware/software/firmware based interfaces that enable the device to connect to and communicate over network 102. A computing system 122 may also have one or more software and/or firmware and/or hardware based application(s) that execute on the computing system in order to intercommunicate with a service provider 110/server 112. As another example, a computing system 122 may interwork with a service provider 110/server 112 through a web based application hosted by server 112. One skilled in the art will recognize that other variations are possible.

Users 130 may be users/players of games provided by a service provider 110. Any given user may play such games through one or more computing systems 132 such as a computer, server, laptop, computing pad, smart phone etc. that may intercommunicate with a server 112, for example, and/or one or more other computing systems 132 of other users 130. A computing system 132 may be dedicated to interworking with a service provider(s) 110/server 112 and or may be a general purpose device. Such a computing system may include one or more processors and one or memories and/or be interfaced to one or more external memories, such as one or more and/or databases. A computing system 132 may include one or more network hardware/software/firmware based interfaces that enable the device to connect to and communicate over network 102. A computing system 132 may also include one or more software and/or firmware and/or hardware based application(s) that execute on the computing system in order to intercommunicate with a service provider 110/server 112 and/or other users/computing devices 132 in order to play games, for example. As another example, a computing system 132 may interwork with a service provider 110/server 112 through a web based application hosted by server 112. One skilled in the art will recognize that other variations are possible.

Network 102 may include a public and/or private network(s) and be a wired and/or wireless network based on any type of technology. Network 102 may include in part the Internet.

According to an example embodiment, before a user can begin using the services of a service provider 110 (e.g., playing a game/games), the user may need to register with the service provider to become an authorized player and/or to create a gaming account. According to an example embodiment, the user may do this in person with the service provider. According to another example, the user may do this remotely via a computing system, such as a computing system 132. As one example, the user, via a computing system 132, may access a web site hosted by a server 112 (one skilled in the art will recognize that the user may access server 112 in other fashions). Via that web site, the user may indicate a desire to register with the service provider 110. As part of the registration, server 112 may prompt the user to enter at computing system 132 an identity (e.g., first and/or last name), date of birth, physical address of residence, social security number, and/or email address, etc. Assuming the registration is successful, in return server 112 may assign an ID(s) 134 to the user, such as login and password. The login and/or password may be chosen by the user and/or server 112. As part of registration, server 112 may also prompt the user to answer one or more questions (such as, for example, first pet/pet name, high school/college graduated from, mother's maiden name, etc.). Assuming the registration is successful, the user may also add funds to a gaming account (assuming the wagering is for money) as part of the registration. For example, the user may provide a credit card to fund the account, fund the account via PayPal, may wire transfer funds to the account, etc. As another example, the user may mail in a check, etc. One skilled in the art will recognize that the user may fund the account in other manners. Once the account is open, the user may be able to begin playing games. According to another example, the user may need to deposit funds via an administrative agent as discussed herein.

According to an example embodiment, as part of registration, the user may also need to verify to the service provider 110 one or more pieces of information provided to the service provider during registration. For example, the user may need to verify that he indeed is the person he entered/identified to the system during registration. Accordingly, as part of registration, server 112 may inform the user via computing system 132, for example, that the user needs to physically visit an administrative agent 120 to authenticate/verify to service provider 110 the user is who he says he is. Server 110 may also inform the user as to one or more documents the user needs to provide the agent (such as license, passport, photo ID, tax bill, social security card, utility bill, etc) to verify this information. Server 112 may provide the user with the name and/or location of one or more administrative agents. Server 110 may also force the user to choose an agent 120 and/or assign the user to an agent 120. Here, server 112 may notify that agent in advance (such as electronically via computing system 122) that the user will be coming to complete registration. Server 112 may also warn the user that the user has x hrs/days/weeks/etc. to perform the verification or his account will be closed/locked. According to one example, a user may be able to being playing games, wagering real money and/or winning money, even though the user has not completed the verification. According to one example, the user may not be able to withdraw any funds from his account (even deposited funds) and/or may only be able to withdraw limited funds from his account until the verification is completed. According to another example, the user may not be able to withdraw any winnings from his account and/or may only be able to withdraw limited winnings from his account until the verification is completed. Here, the user may be able to withdraw deposited funds. According to another example, a user may be able to make a deposit of any amount, or only of a limited amount into his account until the verification is completed.

According to another example, server 112 may also inform the user that the user can deposit funds into his account and/or withdraw funds from his account by visiting an administrative agent 120. Server 112 may provide such information to the user as part of registration and/or the information may be accessible to the user when gaming, for example, via an information/help page, for example.

According to an example, subsequent to registering, a user may physically visit an administrative agent 120 informing the agent that the user needs to complete registration. In response, the administrative agent, using a computing system 122, for example, may access server 112 such as through a dedicated application and/or through a web based application hosted by server 112. Upon accessing server 112, administrative agent 120 may indicate to the server that the agent is verifying the identity of a user, for example, in order to complete the user's registration. Server 112 may provide the agent with a list of users awaiting verification for the agent to choose from. As another and/or additional example, the agent may enter the name of the user the agent is attempting to verify/authenticate. As a further and/or additional example, the agent may be required to enter (or have the user enter) the ID(s) 134 assigned to the user during registration. As part of verification, the agent may visually inspect one or more documents provided by the user. The agent may also visually compare the user to a photo ID provided by the user.

In particular, to perform verification/authentication, server 112 may provide the agent with information the user provided during registration and the agent may compare that information to the document(s) provided by the user. If all information matches including for example, a photo of the user to the user, the agent may indicate to server 112 that the user is verified. As another and/or additional example, the agent may enter into the system information obtained from the documents provided by the user, which information may be conveyed to server 112. Here, server 112 may determine if all information matches and convey back to the agent that the user is verified. Here again, the agent may still need to indicate the user matches a photo ID provided by the user. As another and/or additional example, the agent may need to scan a photo ID of the user and submit the scan in addition to a photo of the user taken by the agent to server 112. Here, an administrator of service provider 110 may compare the photo and scan as part of the verification. As another and/or additional example, the agent may need to scan one or more documents provided by the user and submit these to server 112, possibly in addition to a scan of a photo ID of the user and a photo of the user. Here again, an administrator of service provider 110 may analyze all information provided by the agent in connection with information previously provided by the user in order to perform verification. As another example, the agent may contact an administrator of service provider 110 (such as by phone) and verbally verify to the administrator that the person is verified. One skilled in the art will recognize that other variations are possible including again, any variation/combination of the above. In general, regardless of how verification is performed, the agent may need to scan one or more documents provided by the user and submit these to server 112, possibly in addition to a scan of a photo ID of the user and a photo of the user.

Regardless of the way verification is performed, the agent, at some time during the verification, may need to submit to server 112 his ID 124. In this fashion, server 112/service provider 110 knows that the information is coming from an authorized agent. In the example where an agent speaks with an administrator of service provider 110, the agent may need to verbally provide the ID and/or submit the ID to server 112 via computing system 122.

According to another example, server 110 may prompt the agent to ask the user answers to one or more questions the user provided during registration. Again, server 112 may provide the answers to the agent so the agent may do a visual comparison, and/or the agent may submit the answers to server 110 for the server to do comparisons.

According to another example, a user 130 may also and/or alternatively use an administrative agent 120 to deposit funds into and/or withdraw funds from the user's account. According to an example, a user may physically visit an administrative agent 120 informing the agent that the user would like to make a deposit and/or withdrawal funds. In response, the administrative agent, using a computing system 122, for example, may access server 112 such as through a dedicated application and/or through a web based application hosted by server 112. Upon accessing server 112, administrative agent 120 may indicate to the server that the agent is making a withdrawal and/or making deposit. Server 112 may provide the agent with a list of user's to choose from. As another and/or additional example, the agent may enter the name of the user. As a further and/or additional example, the agent may be required to enter (or have the user enter) the ID(s) 134 assigned to the user during registration. Assuming the user is in the system and can be identified by server 112, server 112 may pull one or more pieces of information from the user's account, such as the user's account balance, and may provide that information to computing system 122. Server 112 also provide a photo of the user to computing system 122 and request the agent to visually verify the photo matches the user. The agent may be required to respond to server 112 that there is a match. Server 112 may also provide an account status such as locked, partially locked, or unlocked thereby indicating whether the user may or may not be able to make a deposit and/or withdrawal and/or may or may not be able to make a partial deposit and/or partial withdrawal.

Assuming the user is seeking to make a deposit and the account is open, the agent may physically receive funds (such as cash, check, money order, etc.) from the user and communicate to server 112 the amount of received funds. In response, server 112 may add the funds to the user's account. Alternatively, the user may indicate that the funds should be transferred to the gaming account from some other account, such as from a debit card account, credit card account, Pay Pal account. Here, the agent may receive the account information from the user and submit such information to server 112 such that the server may effectuate the transfer and add the funds to the user's account (note that according to one example, through the use of agent 120, there is some reassurance to service provider 110 that the account from which funds are being taken is indeed the user's account.) Regardless, the server may then communicate a receipt to the user via email, text, etc. The server may also and/or alternatively communicate a receipt to computing system 122 for the user's inspection and/or for printing by the agent for the user. Server 112 may also display on computing system 122 the user's adjusted balance. One skilled in the art will recognize that other means may be used to convey a verification of account status to the user. As another example, upon receiving funds from the user, the agent may alternatively and/or in addition speak with an administrator of service provider 110 and indicate that the agent has received funds from a user and that the user's account balance should be adjusted accordingly. Again, a receipt may be communicated to the user in various fashions such as through email, text, by communicating a receipt to computing system 122 for printing, etc. One skilled in the art will recognize these are merely examples and other and/or additional variations are possible.

As part of making a deposit to a user's account, the agent, at some time during the deposit, may need to submit to server 112 his ID 124. In this fashion, server 112/service provider 110 knows that an authorized agent has the funds. In the example where an agent speaks with an administrator of service provider 110, the agent may need to verbally provide the ID and/or submit the ID to server 112 via computing system 122.

Assuming the user is seeking to make a withdrawal and the account is open, the agent may communicate to server 112 that amount of funds the user wishes to withdraw. In response, server 112 may determine if such requested amount can be withdrawn (e.g., does the account have sufficient funds) and/or a lesser amount that can be withdrawn and accordingly withdraw the funds from the user's account/adjust the account balance. The server may then communicate to computing system 122 the amount withdrawn (again, which amount may be less than requested). In turn, the agent may then hand to the user the indicated amount of funds (e.g., in cash, check, money order, etc). Alternatively, the user may indicate that the funds should be transferred from the gaming account to some other account, such as a debit card account, credit card account, Pay Pal account. Here, the agent may receive the account information from the user and submit such information to server 112 such that the server may effectuate the transfer and remove the funds to the user's account and add the funds to the designated account (note that according to one example, through the use of agent 120, there is some reassurance to service provider 110 that the account to which funds are being transferred is indeed the user's account.) The server may then communicate a receipt to the user via email, text, etc. The server may also and/or alternatively communicate a receipt to computing system 122 for the user's inspection and/or for printing by the agent for the user. Server 112 may also display on computing system 122 the user's adjusted balance. One skilled in the art will recognize that other means may be used to convey a verification of account status to the user. As another example, the agent may alternatively and/or in addition speak with an administrator of service provider 110 and indicate that a user wishes to withdrawal funds and that the user's account balance should be adjusted accordingly. Similar to above, the administrator of service provider 110 may determine an amount, if any that can be withdrawn, and communicate such to the agent. Again, a receipt may be communicated to the user in various fashions such as through email, text, by communicating a receipt to computing system 122 for printing, etc. One skilled in the art will recognize these are merely examples and other and/or additional variations are possible.

As part of making a withdrawal from a user's account, the agent, at some time during the withdrawal, may need to submit to server 112 his ID 124. In this fashion, server 112/service provider 110 knows that an authorized agent is making the request and that funds are being properly dispersed to a user. In the example where an agent speaks with an administrator of service provider 110, the agent may need to verbally provide the ID and/or submit the ID to server 112 via computing system 122.

According to another example, a user 130 may also and/or alternatively use an administrative agent 120 to transfer funds between multiple gaming accounts of the user. For example, a service provider 110 may require a user have different accounts for different types of gaming. For example, a user may have one account for wagering/betting on sports, one account for wagering/betting on casino type games, one account for wagering/betting on interactive games (like poker). As another example, a user may have multiple accounts with different service providers 110. According to an example, a user may physically visit an administrative agent 120 informing the agent that the user would to like to transfer funds between accounts. Assuming the accounts are with the same service provider, the administrative agent, using a computing system 122, for example, may access a server 112 of the provider as similarly discussed above, and then instruct the server to transfer funds between the accounts, as similarly discussed above. Assuming the accounts are with different service providers, the administrative agent, using a computing system 122, for example may access a server 112 of each service provider as similarly discussed above, and withdrawal the funds from one account and deposit the funds into another account, as similarly discussed above. Between transfers, the agent may place the funds in an account of the agent. One skilled in the art will recognize that other variations are possible to transfer funds between accounts.

According to another example, an administrative agent may charge and/or collect a fee from a user 130 and/or a service provider 110 for assisting in the registration of a user, for depositing funds into a user's account, and/or for withdrawing funds from a user's account.

According to another example, a user via a computing system 132 and/or via an agent/computing system 132 may be able to obtain from a service provider via server 112, for example, each amount a user has won, each amount a user has lost, a user's total winnings, a user's total losses, and/or a user's net losses or winnings. Such a report may be over a specified duration of time, such as a given month or months, a given calendar year, etc. In the event the user has multiple accounts with a given service provider, the report may be over each account and a summary for all accounts. According to another example, an agent, such as through a computing system 132, for example, may generate such a report for a user if the user has accounts across multiple service providers. According another example, a user may be able to use such a report(s) for tax reporting purpose to one or more jurisdictions (such as a country, state, city, federal, or other geographical region or tax jurisdiction.)

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

The following sections provide a guide to interpreting the present application.

I. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise.

The term "variation" of an invention means an embodiment of the invention, unless expressly specified otherwise.

The term "indication" is used in an extremely broad sense. An "indication" of a thing should be understood to include anything that may be used to determine the thing.

An indication of a thing may include an electronic message that identifies the thing (e.g., an identification of a widget by a serial number affixed to the widget, an identification of a widget by one or more characteristics of the widget). An indication of a thing may include information that may be used to compute and/or look-up a thing (e.g., information identifying a machine of which a widget is a part that may be used to determine the widget). An indication of a thing may specify things that are related to the thing (e.g., characteristics of the thing, a name of the thing, a name of a thing related to the thing). An indication of a thing may not specify things that are related to the thing (e.g., a letter "a" may be an indication of a widget of a computer system that is configured to interpret the letter "a" to identify the widget). An indication of a thing may include a sign, a symptom, and/or a token of the thing. An indication, for example, may include a code, a reference, an example, a link, a signal, and/or an identifier. An indication of a thing may include information that represents, describes, and/or otherwise is associated with the thing.

A transformation of an indication of a thing may be an indication of the thing (e.g., an encrypted indication of a thing may be an indication of the thing). An indication of a thing may include the thing itself, a copy of the thing, and/or a portion of the thing. An indication of a thing may be meaningless to a thing that is not configured to understand the indication (e.g., a person may not understand that a letter "a" indicates a widget but it may nonetheless be an indication of the widget because the computer system may determine the widget from the letter "a"). It should be understood that the fact that an indication of a thing may be used to determine the thing does not mean that the thing or anything else is determined. An indication of a thing may include an indication of any number of the thing unless specified otherwise. An indication of a thing may include an indication of other things (e.g., an electronic message that indicates many things). (Indication can be used as a very broad term in claim language. For example: receiving an indication of a financial instrument.)

The term "represent" means (1) to serve to express, designate, stand for, or denote, as a word, symbol, or the like does; (2) to express or designate by some term, character, symbol, or the like; (3) to portray or depict or present the likeness of, as a picture does; or (4) to serve as a sign or symbol of.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may include or cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments may cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well.

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The terms "a", "an" and "the" refer to "one or more", unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the feature," then the phrase "the feature" should be understood to refer to the previously mentioned "a specific single feature." (It should be understood that the term "a" in "a specific single feature" refers to "one" specific single feature and not "one or more" specific single features.)

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". The phrase "based at least on" is equivalent to the phrase "based at least in part on". For example, the phrase "element A is calculated based on element B and element C" covers embodiments where element A is calculated as the product of B times C (in other words, A=B×C), embodiments where A is calculated as the sum of B plus C (in other words, A=B+C), embodiments where A is calculated as a product of B times C times D, embodiments where A is calculated as a sum of the square root of B plus C plus D times E, and so on.

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" modifies do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers in the range, unless expressly specified otherwise. For example, the range "1 to 10" includes the integers from 1 to 10 (e.g., 1, 2, 3, 4, . . . 9, 10) and non-integers (e.g., 1.0031415926, 1.1, 1.2, . . . 1.9).

Where two or more terms or phrases are synonymous (e.g., because of an explicit statement that the terms or phrases are synonymous), instances of one such term or phrase does not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), rendering into electronic format or digital representation, ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing, averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

The term "determining" may include "calculating". The term "calculating" should be understood to include performing one or more calculations. Calculating may include computing, processing, and/or deriving. Calculating may be performed by a computing device. For example, calculating a thing may include applying an algorithm to data by a computer processor and generating the thing as an output of the processor.

The term "determining" may include "referencing". The term "referencing" should be understood to include making one or more reference, e.g., to a thing. Referencing may include querying, accessing, selecting, choosing, reading, and/or looking-up. The act of referencing may be performed by a computing device. For example, referencing a thing may include reading a memory location in which the thing is stored by a processor.

The term "determining" may include "receiving". For example, receiving a thing may include taking in the thing. In some embodiments, receiving may include acts performed to take in a thing, such as operating a network interface through which the thing is taken in. In some embodiments, receiving may be performed without acts performed to take in the thing, such as in a direct memory write or a hard wired circuit. Receiving a thing may include receiving a thing from a remote source that may have calculated the thing.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. In some embodiments, such a plurality of computer-based devices may operate together to perform one step of a process such as is common in grid computing systems. In some embodiments, such a plurality of computer-based devices may operate provide added functionality to one another so that the plurality may operate to perform one step of a process such as is common in cloud computing systems. (Conversely, a single computer-based device may be substituted with multiple computer-based devices operating in cooperation with one another. For example, a single computing device may be substituted with a server and a workstation in communication with one another over the internet) Accordingly, the various functionality that is described as being possessed by more than one device or article may alternatively be possessed by a single device or article.

The functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed invention is widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims that recite anything other than a statutory class shall be interpreted to recite purposes, benefits and possible uses of the claimed invention, and such preambles shall not be construed to limit the claimed invention.

The present disclosure is not a literal description of all embodiments of the invention. Also, the present disclosure is not a listing of features of the invention which must be present in all embodiments.

All disclosed embodiments are not necessarily covered by the claims (even including all pending, amended, issued and canceled claims). In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries. Devices are in communication with one another if they are capable of at least one-way communication with one another. For example, a first device is in communication with a second device if the first device is capable of transmitting information to the second device. Similarly, the second device is in communication with the first device if the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

The term "compute" shall mean to determine using a processor in accordance with a software algorithm.

A "processor" means one or more microprocessors, central processing units (CPUs), computing devices, microcontrollers, digital signal processors, graphics processing units (GPUs) or like devices or any combination thereof, regardless of the architecture (e.g., chip-level multiprocessing or multi-core, RISC, CISC, Microprocessor without Interlocked Pipeline Stages, pipelining configuration, simultaneous multithreading, microprocessor with integrated graphics processing unit, GPGPU).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the method.

The apparatus that performs the process can include a plurality of computing devices that work together to perform the process. Some of the computing devices may work together to perform each step of a process, may work on separate steps of a process, may provide underlying services that other computing devices that may facilitate the performance of the process. Such computing devices may act under instruction of a centralized authority. In another embodiment, such computing devices may act without instruction of a centralized authority. Some examples of apparatus that may operate in some or all of these ways may include grid computer systems, cloud computer systems, peer-to-peer computer systems, computer systems configured to provide software as a service, and so on. For example, the apparatus may comprise a computer system that executes the bulk of its processing load on a remote server but outputs display information to and receives user input information from a local user computer, such as a computer system that executes VMware software.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any non-transitory medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), wireless local area network communication defined by the IEEE 802.11 specifications whether or not they are approved by the WiFi Alliance, SAP, ATP, Bluetooth™, and TCP/IP, TDMA, CDMA, and 3G; and/or (iv) encrypted to ensure privacy or prevent fraud in any of a variety of ways well known in the art.

The term "database" refers to any electronically-stored collection of data that is stored in a retrievable format.

The term "data structure" refers to a database in a hardware machine such as a computer.

The term "network" means a series of points or nodes interconnected by communication paths. For example, a network can include a plurality of computers or communication devices interconnected by one or more wired and/or wireless communication paths. Networks can interconnect with other networks and contain subnetworks.

The term "predetermined" means determined beforehand, e.g., before a present time or a present action. For example, the phrase "displaying a predetermined value" means displaying a value that was determined before the act of displaying.

The term "condition" means (1) a premise upon which the fulfillment of an agreement depends, or (2) something essential to the appearance or occurrence of something else.

The term "transaction" means (1) an exchange or transfer of goods, services, or funds, or (2) a communicative action or activity involving two parties or things that reciprocally affect or influence each other.

Thus a description of a process is likewise a description of a computer-readable medium storing a program for performing the process. The computer-readable medium can store (in any appropriate format) those program elements which are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel®, Pentium®, or Centrino™, Atom™ or Core™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As used herein, the term "encryption" refers to a process for obscuring or hiding information so that the information is not readily understandable without special knowledge. The process of encryption may transform raw information, called plaintext, into encrypted information. The encrypted information may be called ciphertext, and the algorithm for transforming the plaintext into ciphertext may be referred to as a cipher. A cipher may also be used for performing the reverse operation of converting the ciphertext back into plaintext. Examples of ciphers include substitution ciphers, transposition ciphers, and ciphers implemented using rotor machines.

In various encryption methods, ciphers may require a supplementary piece of information called a key. A key may consist, for example, of a string of bits. A key may be used in conjunction with a cipher to encrypt plaintext. A key may also be used in conjunction with a cipher to decrypt ciphertext. In a category of ciphers called symmetric key algorithms (e.g., private-key cryptography), the same key is used for both encryption and decryption. The sanctity of the encrypted information may thus depend on the key being kept secret. Examples of symmetric key algorithms are DES and AES. In a category of ciphers called asymmetric key algorithms (e.g., public-key cryptography), different keys are used for encryption and decryption. With an asymmetric key algorithm, any member of the public may use a first key (e.g., a public key) to encrypt plaintext into ciphertext. However, only the holder of a second key (e.g., the private key) will be able to decrypt the ciphertext back in to plaintext. An example of an asymmetric key algorithm is the RSA algorithm.

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application will be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference. Conversely, the definitions provided in this application should not be used to limit, define, or otherwise construe any term of any document incorporated herein by reference. The definitions set forth explicitly in this application are controlling notwithstanding the description of particular embodiments that may be incompatible with the definition(s).

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

What is claimed is:
1. A method comprising:
receiving, over a communication network, by at least one processor from a user via a computing system in use by the user and a second computing system, a request to receive a status of an account of the user, the account being associated with a service provider that provides gaming services from the at least one processor over the communication network to the computing system;

responsive to receiving the request, displaying, by the at least one processor, over the communication network, on a display associated with the second computing system, data that includes amounts the user has won and amounts the user has lost in playing at the computing system games provided by the service provider from the at least one processor over the communication network; and communicating, by the at least one processor, over the communication network, to the second computing system that the user needs to complete registration with the service provider by performing an identity verification, in which the identity verification includes providing, over the communication network, from the second computing system, to the at least one processor, a scan of an identification document of the user entered at the second computing system, and wherein the user has limited access to the gaming services until the user completes the identity verification.

2. The method of claim 1, wherein the data further includes total winnings and total losses of the user in playing games provided by the service provider.

3. The method of claim 2, wherein the data is for a given calendar year.

4. The method of claim 3, wherein the user has a plurality of accounts with the service provider, and wherein the data includes amounts the user has won and amounts the user has lost in playing games provided by the service provider in association with each account.

5. The method of claim 1, wherein in the event the user has multiple accounts with a given service provider, the data may be over each account and a summary for all accounts.

6. The method of claim 1, further comprising an agent to generate the data for a user if the user has accounts across multiple service providers.

7. An apparatus comprising:
at least one processor; and
a memory having instructions stored thereon that when executed by the at least one processor direct the at least one processor to:
receive, over a communication network, from a user via a computing system in use by the user and a second computing system, a request to receive a status of an account of the user, the account being associated with a service provider that provides gaming services from the at least one processor over the communication network to the computing system;
responsive to receiving the request, display, over the communication network, on a display associated with the second computing system, data that includes amounts the user has won and amounts the user has lost in playing at the computing system games provided by the service provider from the at least one processor over the communication network to the computing system; and
communicate, over the communication network, to the second computing system that the user needs to complete registration with the service provider by performing an identity verification, in which the identity verification includes providing, over the communication network, from the second computing system, to the at least one processor, a scan of an identification document of the user entered at the second computing system, and wherein the user has limited access to the gaming services until the user completes the identity verification.

8. The apparatus of claim 7, wherein the data further includes total winnings and total losses of the user in playing games provided by the service provider.

9. The apparatus of claim 8, wherein the data is for a given calendar year.

10. The apparatus of claim 9, wherein the user has a plurality of accounts with the service provider, and wherein the data includes amounts the user has won and amounts the user has lost in playing games provided by the service provider in association with each account.

11. The apparatus of claim 7, wherein in the event the user has multiple accounts with a given service provider, the data may be over each account and a summary for all accounts.

12. The apparatus of claim 7, further comprising an agent to generate the data for a user if the user has accounts across multiple service providers.

13. The apparatus of claim 8, in which the system is dedicated to interworking with service providers of gaming services.

14. A non-transitory computer-readable media, to have stored thereon instructions that, when executed by a processor, cause the processor to:
receive, over a communication network, from a user via a computing system in use by the user and a second computing system, a request to receive status of an account of the user, the account being associated with a service provider that provides gaming services from the processor over the communication network to the computing system;
responsive to receiving the request, display, over the communication network, on a display associated with the second computing system, data that includes amounts the user has won and amounts the user has lost in playing at the computing system games provided by the service provider from the processor over the communication network; and
communicate over the communication network, to the second computing system that the user needs to complete registration with the service provider by performing an identity verification, in which the identity verification includes providing, over the communication network, from the second computing device, to the processor, a scan of an identification document of the user entered at the second computing device, and wherein the user has limited access to the gaming services until the user completes the identity verification.

15. The non-transitory computer-readable media of claim 14, in which the instructions further cause the processor to have total winnings and total losses of the user in playing games provided by the service provider.

16. The non-transitory computer-readable media of claim 15, in which the instructions further cause the processor to have the data for a given calendar year.

17. The non-transitory computer-readable media of claim 16, in which the instructions further cause the processor to have the plurality of accounts with the service provider, and wherein the data includes amounts the user has won and amounts the user has lost in playing games provided by the service provider in association with each account.

18. The non-transitory computer-readable media of claim 14, in which the instructions further cause the processor to have the system dedicated to interworking with service providers of gaming services.

19. The non-transitory computer-readable media of claim 14, in which in the event the user has multiple accounts with a given service provider, the data is over each account and a summary for all accounts.

20. The non-transitory computer-readable media of claim 14, in which the instructions further cause the processor to have an agent generate the data for a user if the user has accounts across multiple service providers.

\* \* \* \* \*